United States Patent [19]
Benesch

[11] Patent Number: 5,507,701
[45] Date of Patent: Apr. 16, 1996

[54] TRANSMISSION DEVICE

[76] Inventor: Lloyd Benesch, 29 Old Meeting House Rd., Auburn, Mass. 01501

[21] Appl. No.: 387,645
[22] Filed: Feb. 13, 1995

Related U.S. Application Data

[63] Continuation of Ser. No. 29,736, Mar. 11, 1993.
[51] Int. Cl.⁶ .................................................... F16H 3/70
[52] U.S. Cl. .............................. 475/169; 475/170; 74/117
[58] Field of Search ..................... 74/116, 117; 475/162, 475/169, 170

[56]  References Cited

U.S. PATENT DOCUMENTS

| | | | |
|---|---|---|---|
| 4,497,221 | 2/1985 | Koser | 475/169 X |
| 4,916,974 | 4/1990 | Kozakae et al. | 475/170 X |
| 5,029,486 | 7/1991 | Mercat | 475/170 X |

Primary Examiner—Charles A. Marmor
Assistant Examiner—Peter Kwon
Attorney, Agent, or Firm—Kenyon & Kenyon

[57]  ABSTRACT

A Benesch transmission transmits power from an input shaft to an output shaft, wherein the input shaft defines a first axis and the output shaft defines a second axis, includes a first member including a contacting surface which extends along at least a portion of a circle. The first member is coupled to the input shaft such that, upon rotation of the input shaft about the first axis, the first member moves so that a central axis of the circle orbits the first axis, and wherein a distance between the central axis and the first axis is variable. A plurality of second members are coupled to the output shaft and extend away from the second axis. Each of the second members extends within the circle such that, upon motion of the first member relative to the first axis, contact between the contacting surface and the second members causes rotation of the output shaft about the second axis.

7 Claims, 12 Drawing Sheets

1

TRANSMISSION DEVICE

This application is a continuation of application Ser. No. 08/029,736, filed on Mar. 11, 1993.

FIELD OF THE INVENTION

The present invention relates generally to power transmission devices and, more specifically, to variable transmission devices.

BACKGROUND OF THE INVENTION

In the past, devices have employed transmissions for varying the rotational speed of an output shaft relative to the rotational speed of an input shaft. Many of these transmissions include a plurality of gears coupled to the output shaft, any one of which may be engaged with a respective gear on the input shaft to achieve a desired gearing ratio. The number of gearing ratios available with these transmissions is limited by the number of gears provided on the output shaft. In addition, the input and output shafts must be momentarily disengaged in order to select a new gearing ratio. This introduces discontinuities into the acceleration or deceleration of the output shaft.

Continuously variable pulley transmissions have been employed in vehicle power train transmissions. These transmissions require a separate mechanism in order to simultaneously adjust the configuration of the input and output shaft pulleys thereby adding to the size and complexity of the transmission.

Thus, there is need for a less complicated transmission which is capable of providing a wide range of gearing ratios while minimizing any discontinuities in the acceleration and deceleration of the output shaft.

SUMMARY OF THE INVENTION

The present invention is directed to an apparatus which transmits power from an input shaft defining a first axis to an output shaft defining a second axis. This Benesch transmission includes a first member including a surface which extends along at least a portion of a circle, the member being coupled to the input shaft such that, upon rotation of the input shaft about the first axis, the first member moves so that the center of the circle orbits the first axis. The distance between the first axis and a central axis extending through the center of the circle, parallel to the first axis, is variable. A plurality of second members are coupled to the output shaft and extend radially away from the second axis within the circle such that, upon motion of the first member relative to the first axis, contact between the first member and the second members causes rotation of the output shaft about the second axis.

2

Figure 1:
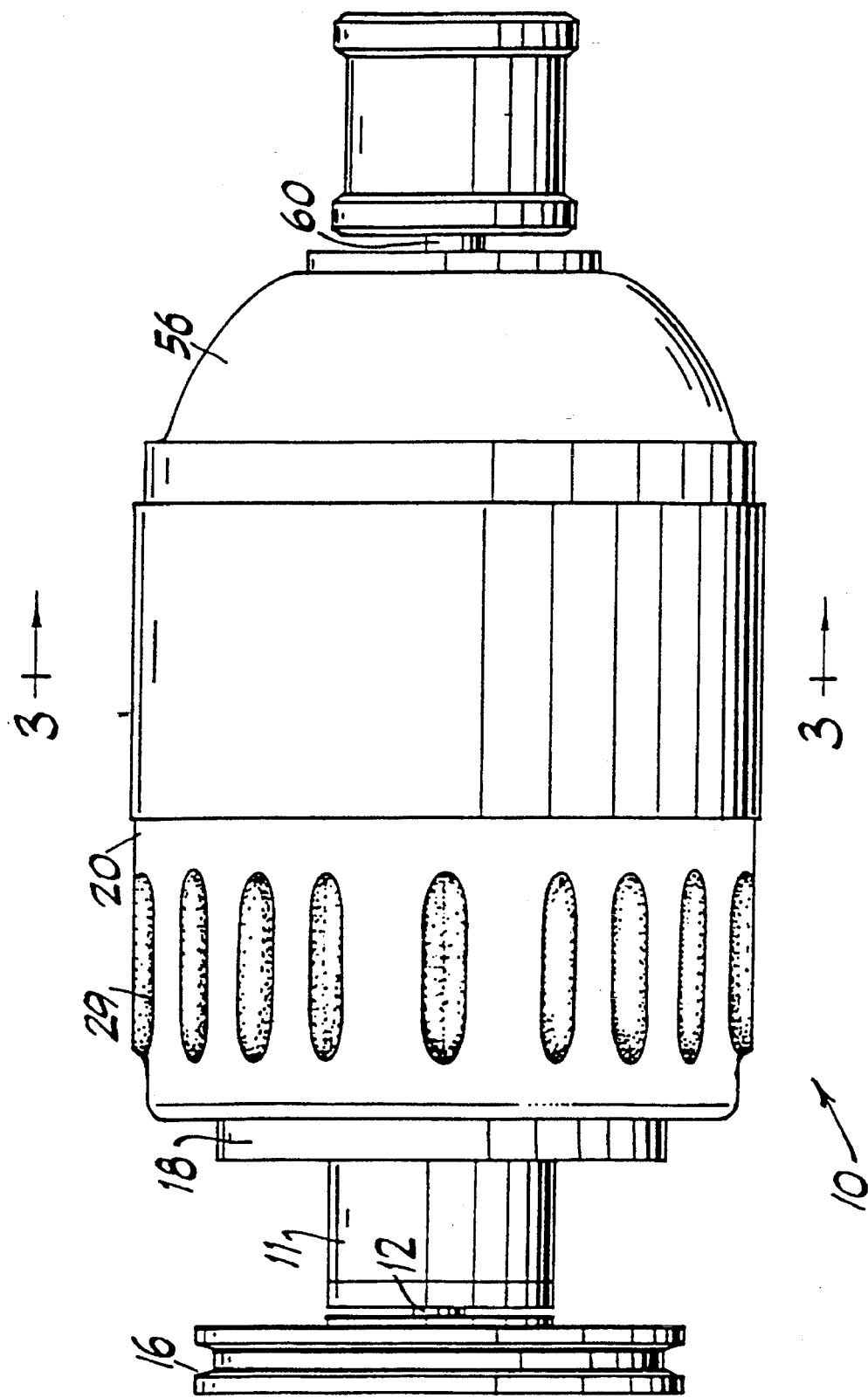
FIG. 1 shows a Benesch transmission according to the present invention.
Figure 4:
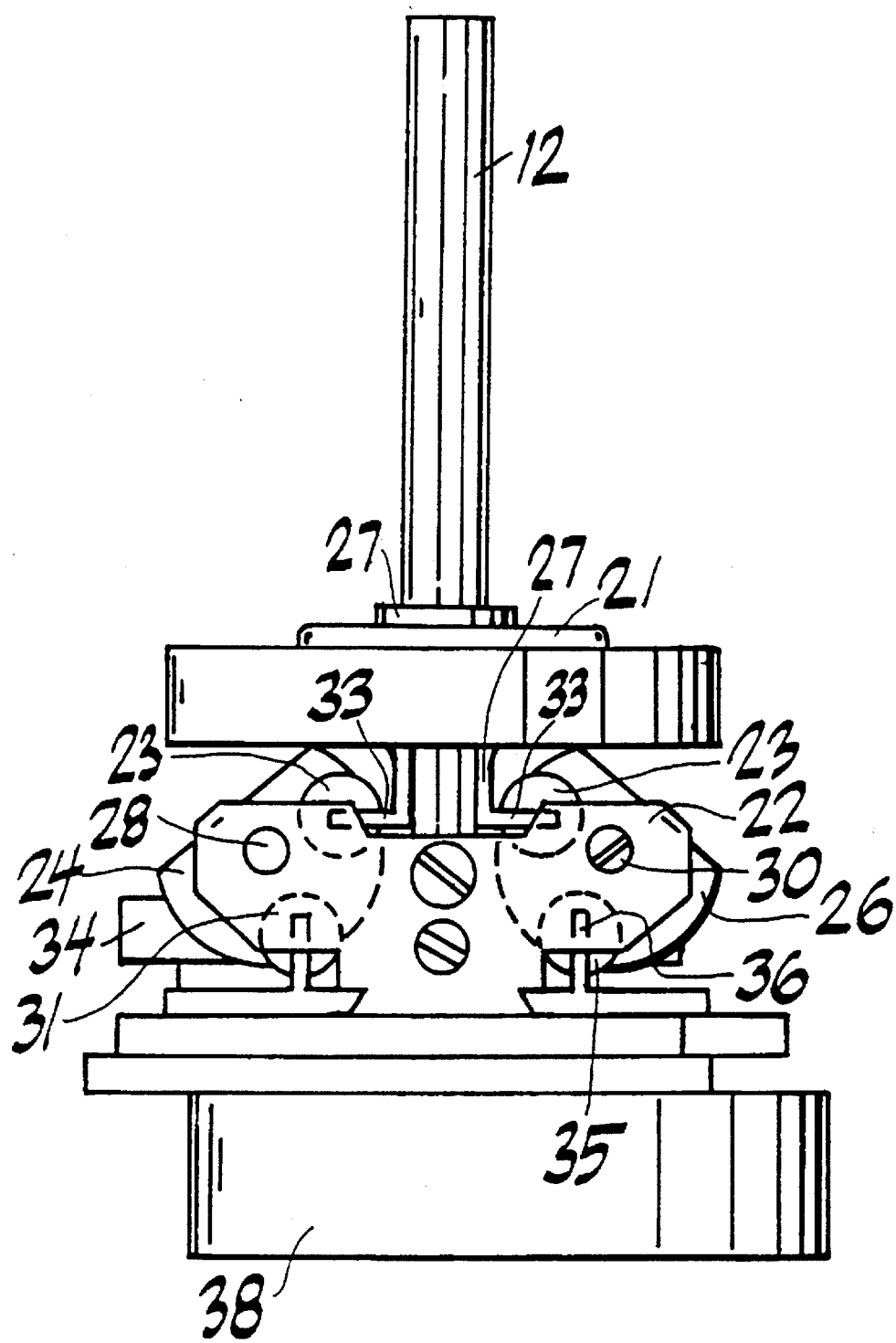
Figure 5:
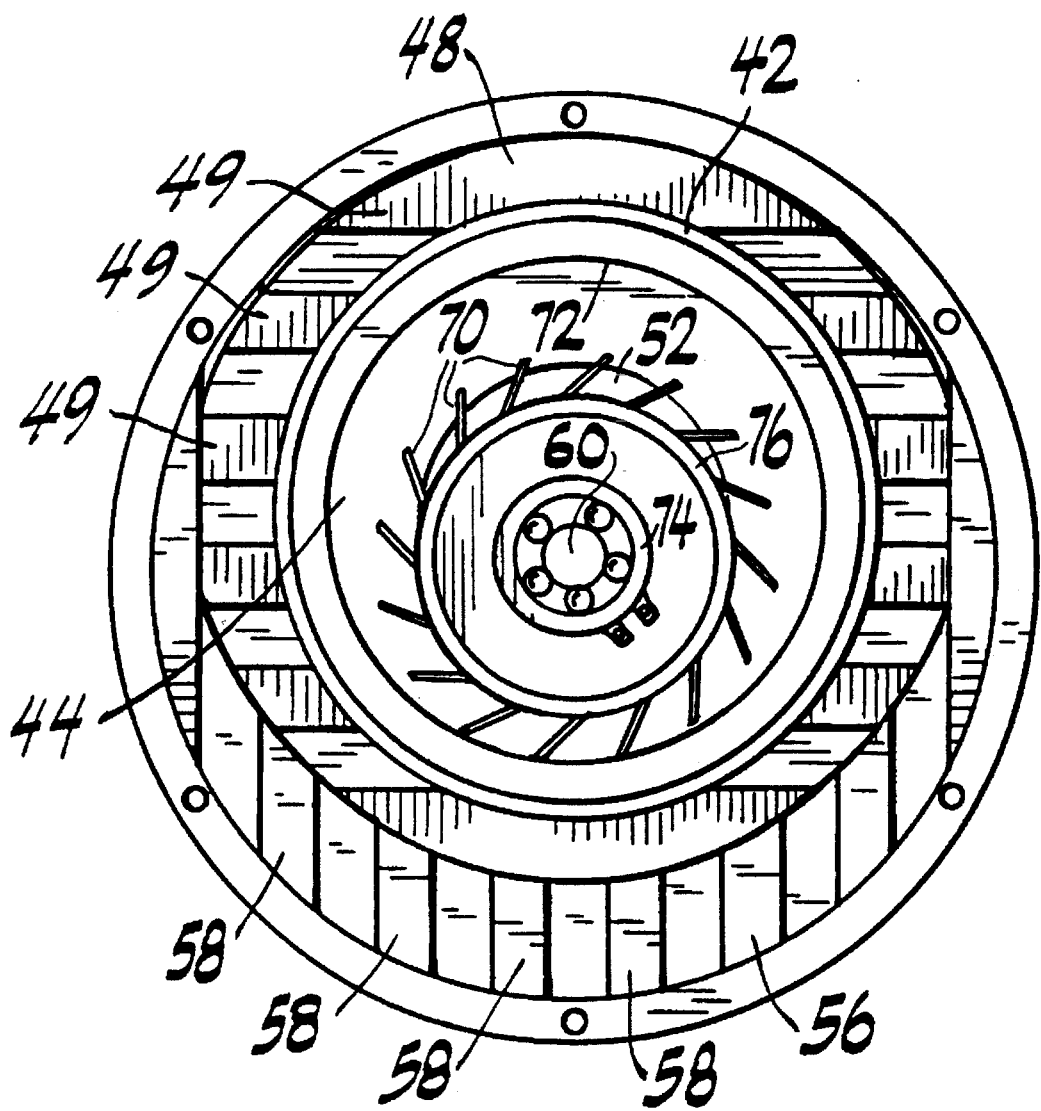
Figure 6:
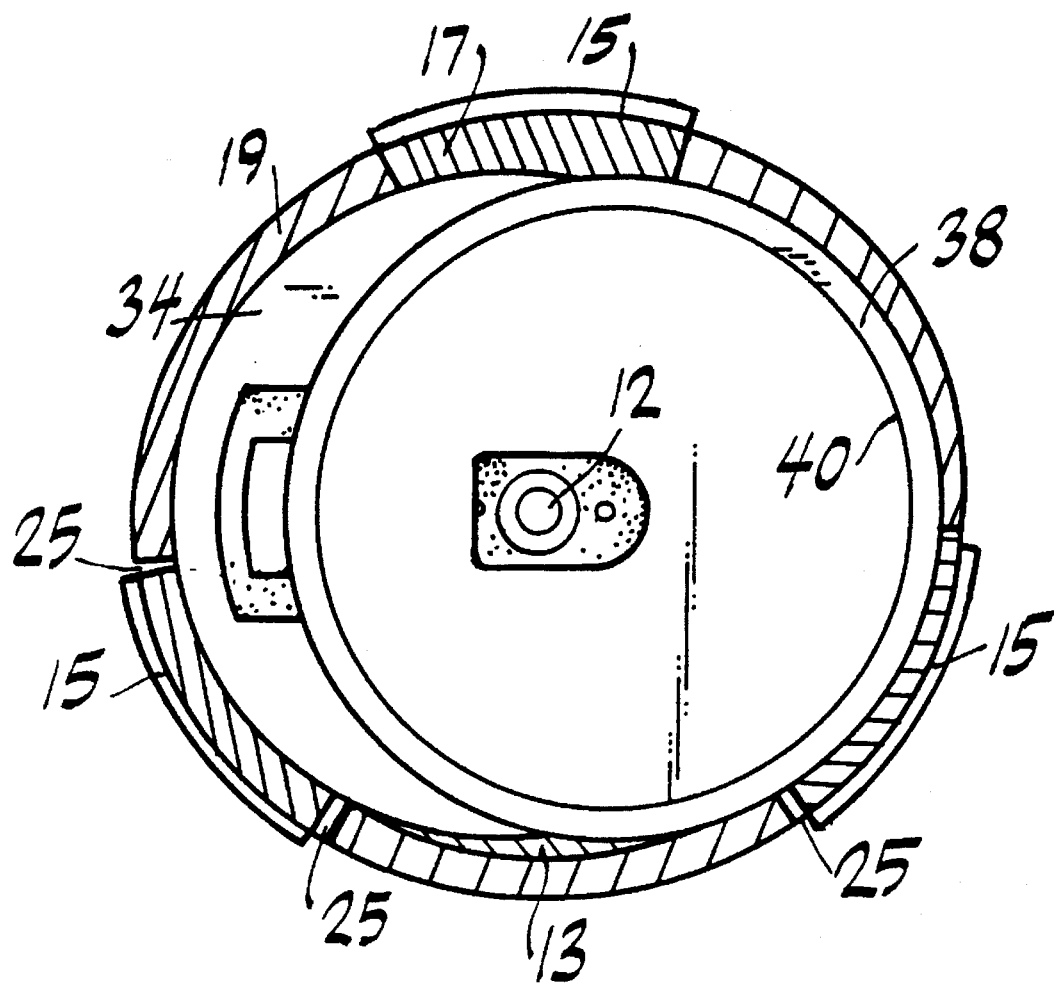
Figure 7:
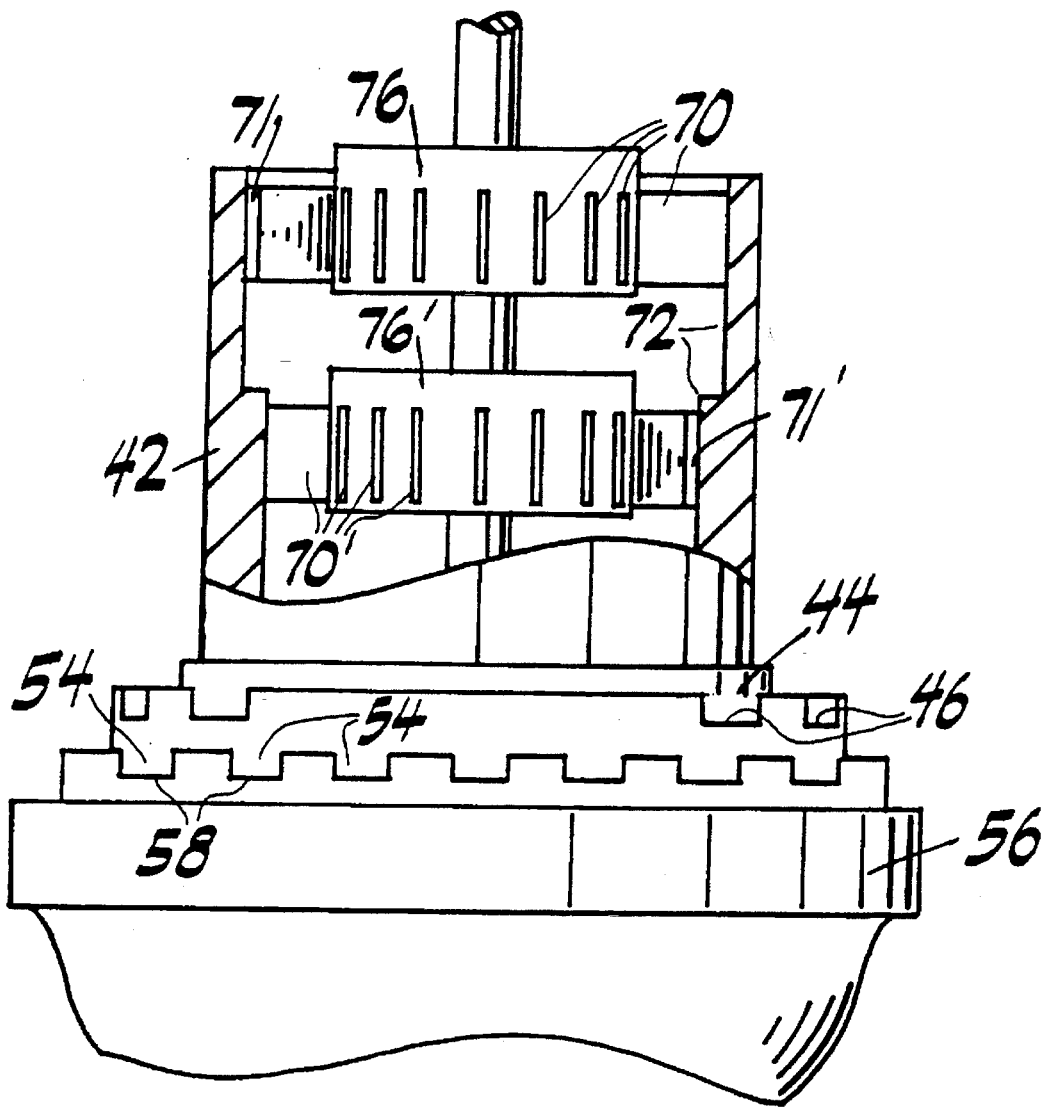
Figure 8:
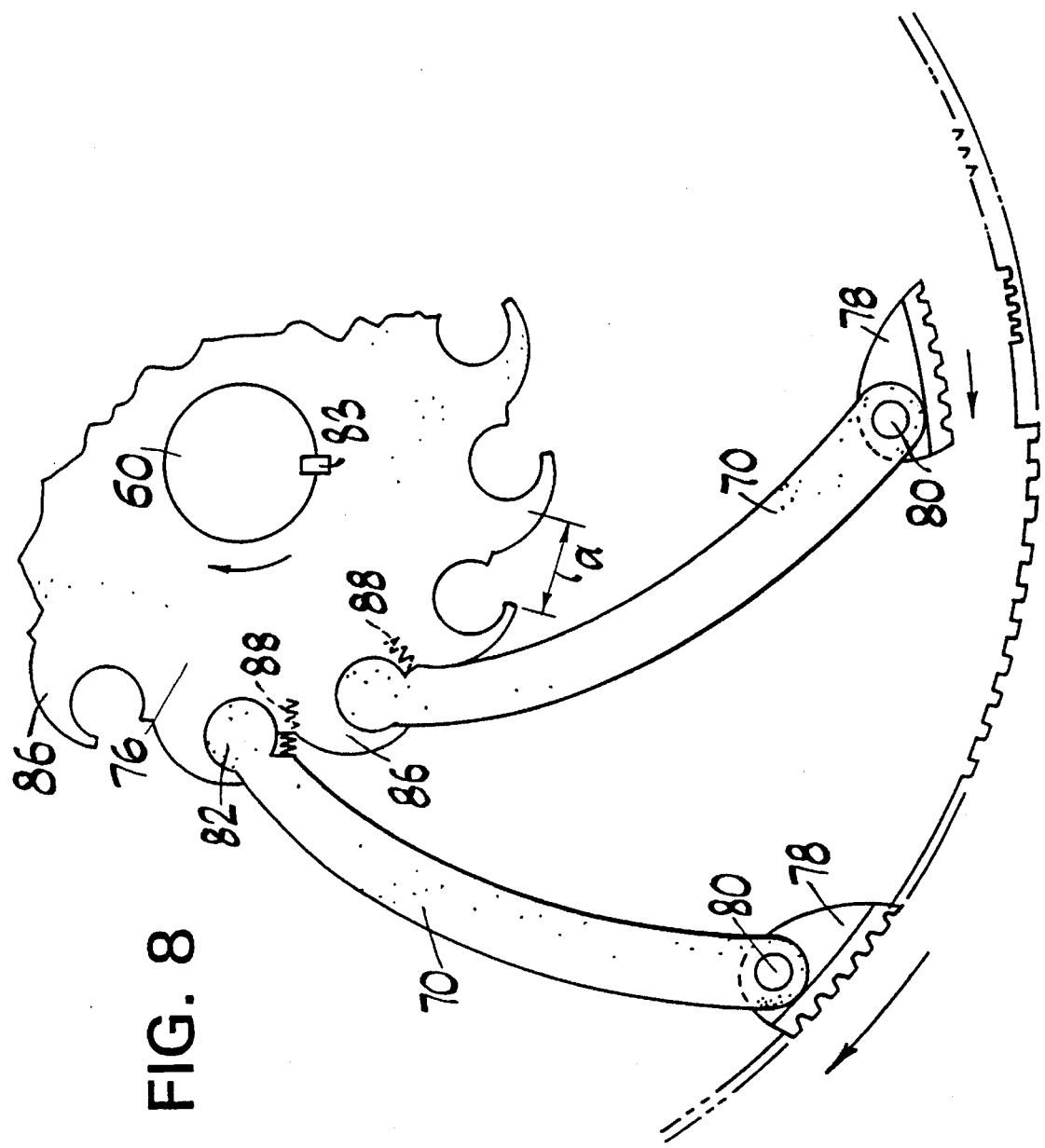
Figure 9:
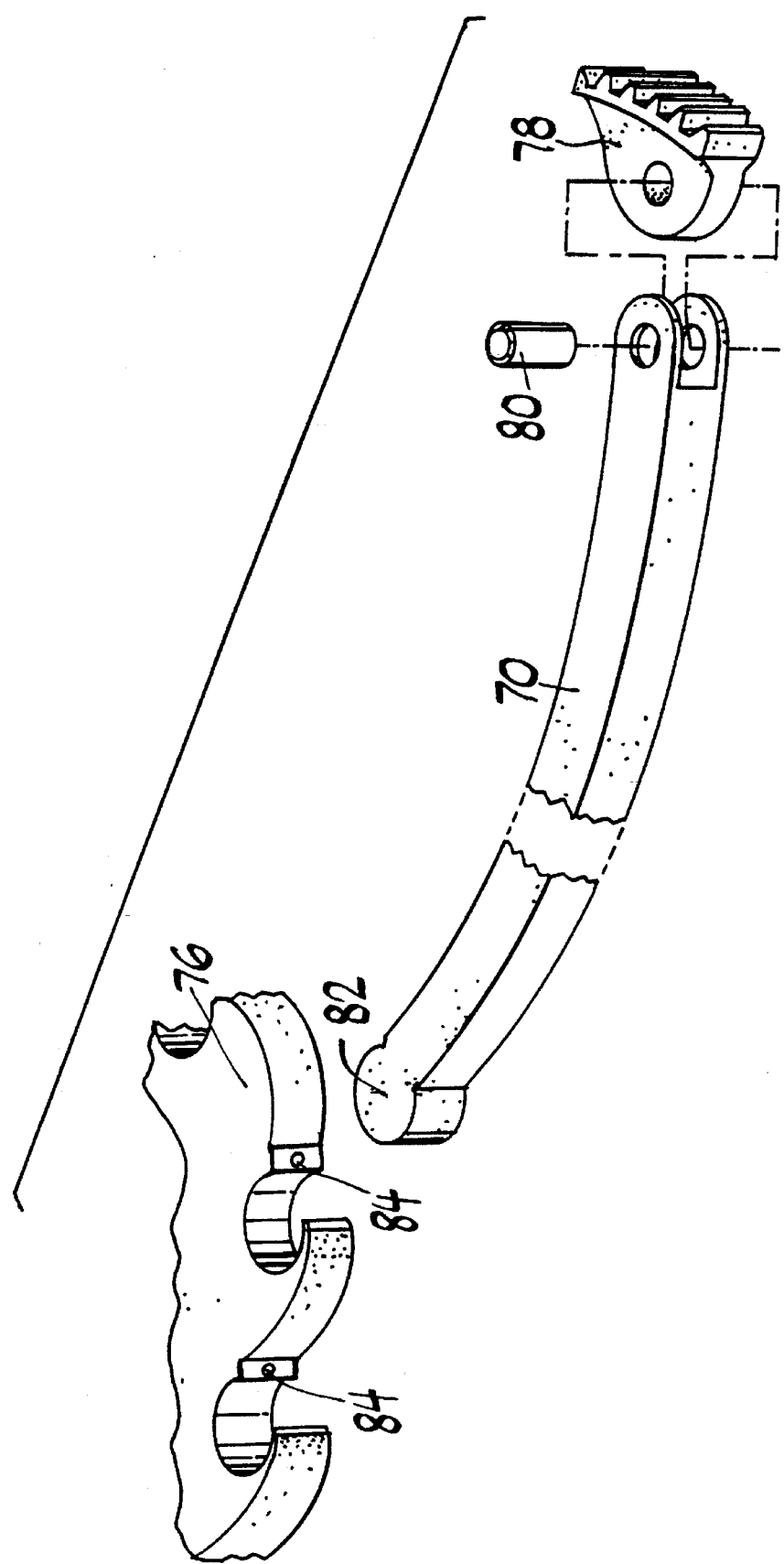
Figure 10:
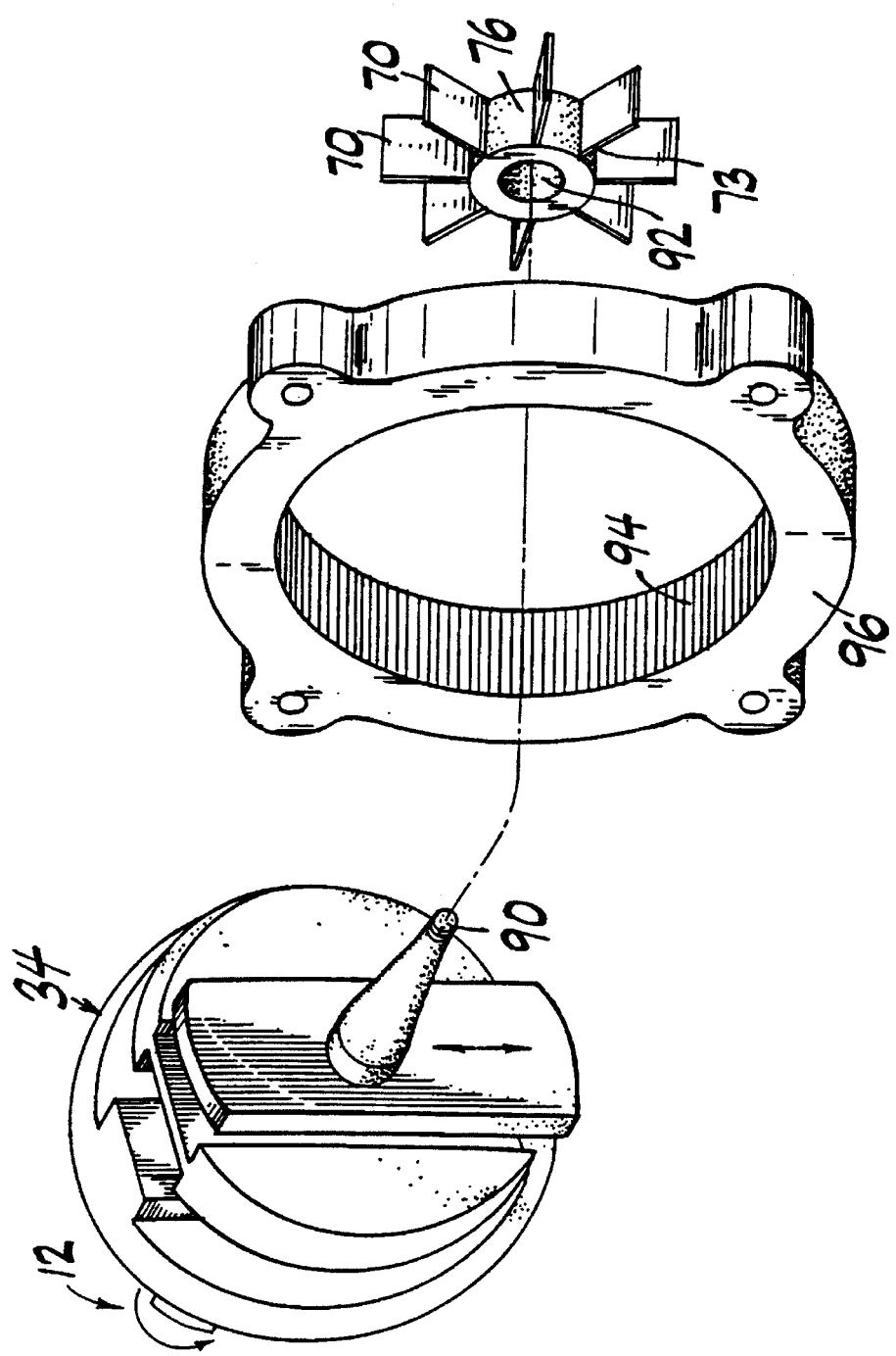
Figure 11:
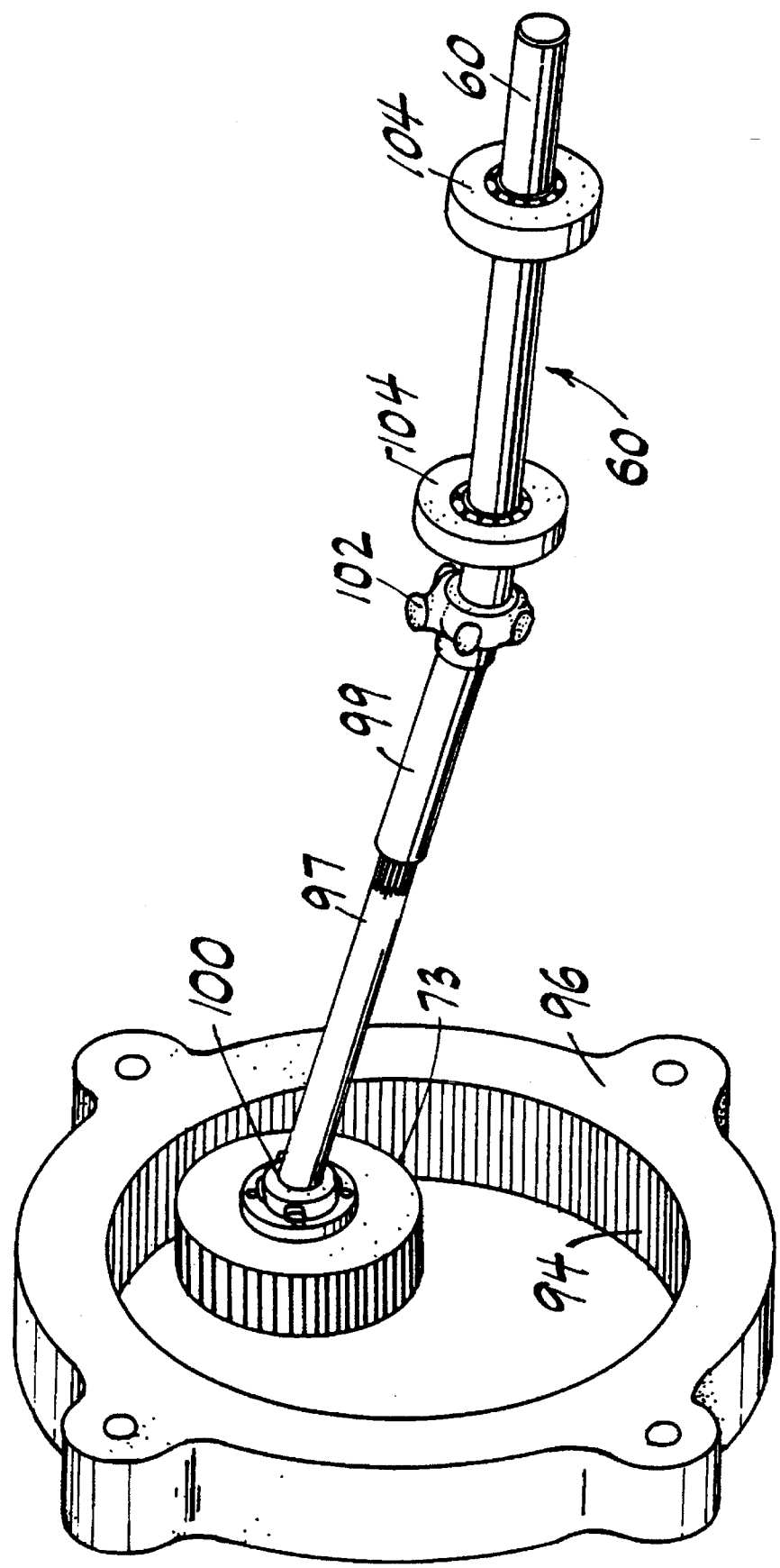
Figure 12:
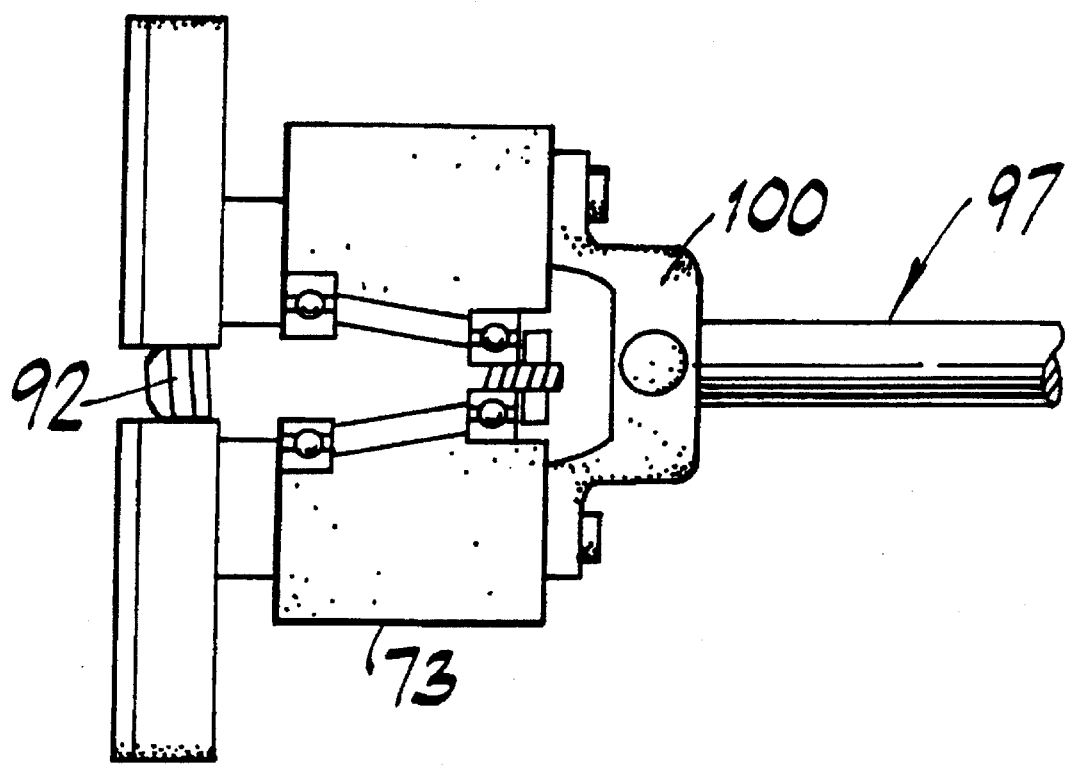

FIG. 4 is a side view of a crank shaft of the Benesch transmission of FIG. 1, wherein a portion of a counterweight has been removed and the transmission is in a non-neutral position;

FIG. 5 is a cross-sectional view of the Benesch transmission according to a first embodiment of the present invention, taken along the line 3—3 of FIG. 1, wherein the transmission is in a non-neutral position;

FIG. 6 is a bottom view of a crank shaft of the Benesch transmission according to the first embodiment, wherein the transmission is in a non-neutral position;

FIG. 7 is a partially cross-sectional view of a power transmission according to a second embodiment of the present invention, taken along line 2—2 of FIG. 1;

FIG. 8 is a cross-sectional view of a Benesch transmission according to a third embodiment of the invention, taken along line 3—3 of FIG. 1;

FIG. 9 is a partial perspective view of a Benesch transmission according to the third embodiment of the present invention;

FIG. 10 shows a transmission according to a fourth embodiment of the present invention;

FIG. 11 shows the arrangement of the output shaft of the transmission of FIG. 10; and FIG. 12 shows side view of the output shaft and a cross-sectional view of the dog unit of the transmission of FIG. 10.

DETAILED DESCRIPTION

Referring to FIGS. 1–6, a power transmission according to the present invention is indicated generally by the numeral 10. The transmission 10 includes an input shaft 12, which is coupled to an electric motor (not shown) by means of a belt mounted in a pulley 16. The input shaft 12 enters a rearward end 11 of the transmission 10 through a hole in a back plate 18 of the transmission housing 20 and extends into the transmission 10, through a bearing 21, to a lateral member 22 which is coupled to the input shaft 12. Two members 24 and 26 are rotatably coupled to opposite ends of the lateral member 22 substantially equidistant from an input axis defined by the input shaft by means of pins 28 and 30, respectively. Slotted circular members 23 are rotatably mounted within members 24 and 26. A projection 33 of a member 27 is received within the slot of each of the slotted circular members 23. The member 27 is coupled to the bearing 21 such that the members 24 and 26 rotate about pins 28 and 30, respectively, when the distance between the bearing 21 and the lateral member 22 is varied. The bearing 21 is mounted to a plate 13 which includes a plurality of projections 17. Each of these projections 17 is slidably received in a corresponding channel 25 formed in a reduced diameter portion 19 of the transmission housing 20. As the channels are formed parallel to the input axis, the plate 13 may move forward and rearward in a direction parallel to the input axis but may not rotate about the input axis. Each projection 17 includes an outer threaded surface 15. The outer threaded surface 15 engages a corresponding inner threaded portion of a rear housing member 29 which is rotatably mounted around the reduced diameter portion 19 so that, when the rear housing member 29 is rotated, the outer threaded surfaces 15 of the projections 17 are engaged by the corresponding inner threaded surface of the rear housing member 29. This causes the plate 13 and, consequently, the bearing 21 to move forward or rearward (depending on the direction of the rotation of the rear housing member 29) relative to the back plate 18 and the lateral member 22.

Figure 2:
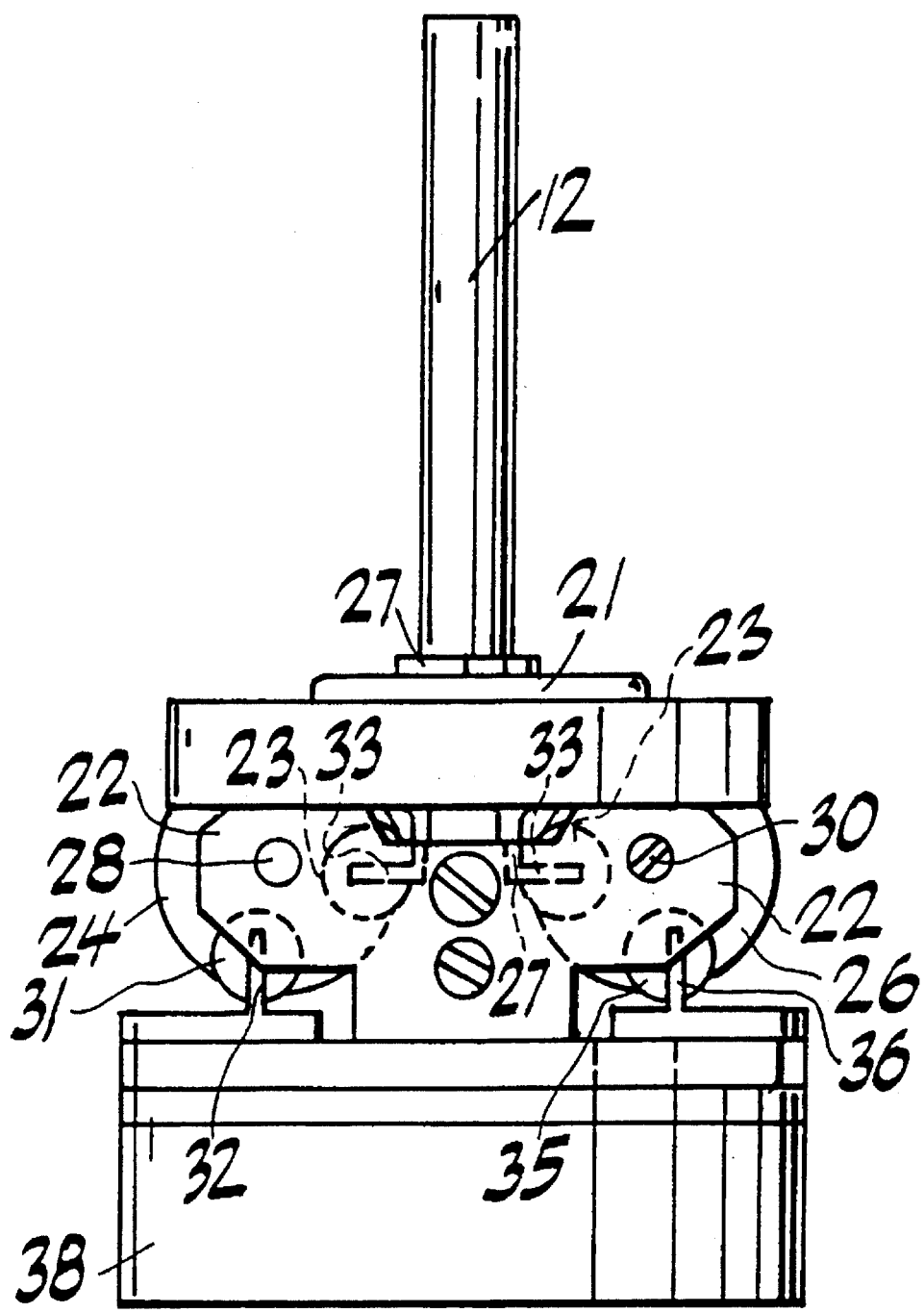
FIG. 2 is a side view of a crank shaft of the Benesch transmission of FIG. 1, wherein a portion of a counterweight has been removed and the transmission is in a neutral position.

The member 24 rotatably receives a slotted circular member 31. A projection 32 which is formed on a moveable crank shaft 38 is received in the slot of the member 31. When the distance between the bearing 21 and the lateral member 22 is increased, the member 24 will rotate counter-clockwise as seen in FIGS. 2 and 4. This rotation of the member 24 relative to the projection 32 causes the moveable crank shaft 38 to move away from the input axis, to the right as seen in FIG. 4. The member 26 rotatably receives a slotted circular member 35. A projection 36 formed on a counter-weight 34 is received in the slot of the member 35. When the distance between the bearing 21 and the lateral member 22 is increased, the member 26 will rotate clockwise as seen in FIG. 2. This rotation of the member 26 relative to the projection 36 causes the counterweight 34 to move away from input the axis, to the left as seen in FIG. 4.

Figure 3:
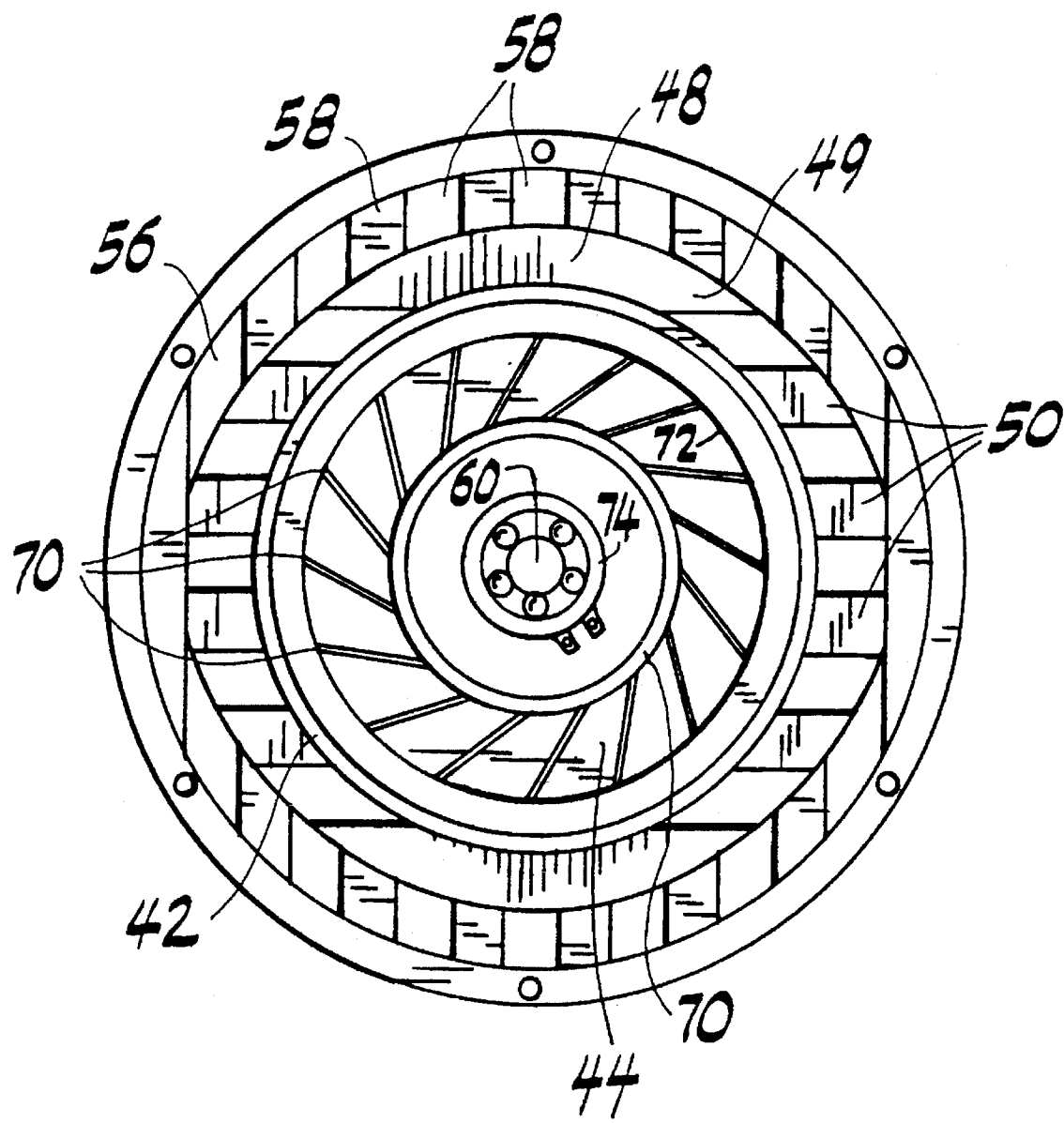
FIG. 3 is a cross-sectional view of the Benesch transmission of FIG. 1, taken along line 3—3 of FIG. 1, wherein the transmission is in a neutral position.

The crank shaft 38 includes a cylindrical inner surface 40, which may be formed of a low friction material such as teflon, adapted to slidably receive a cylindrical member 42 such that the central axes defined by the cylindrical surface 40 and the cylindrical member 42 are substantially coincident. As shown in FIGS. 3, 5 and 7, a disc member 44, which is mounted to a forward end of the cylindrical member 42, includes a plurality of parallel projections 46 of rectangular cross-section which extend across the entire forward surface of the disc member 44. A rearward surface 49 of a plate member 48 includes a plurality of parallel grooves 50 of rectangular cross-section. The plate member 48, which may be formed of a low friction material such as teflon, is mounted adjacent to the disc member 44 so that each rectangular projection 46 of the disc member 44 is received in a corresponding rectangular groove 50. Thus, the disc member 44 is slidably mounted to the plate member 48 such that it and, consequently, the cylindrical member 42 may move, relative to the plate member 48, only in a direction parallel to the rectangular grooves 50.

A forward surface of the plate member 48 includes a plurality of parallel projections 54 of rectangular cross-section which extend across the entire forward surface of the plate member 48. A rearward surface of a forward member 56 includes a plurality of parallel grooves 58 of rectangular cross-section. The forward member 56 is mounted adjacent to the plate member 48 so that each rectangular projection 54 is received in a corresponding rectangular groove 58. Thus, the plate member 48 is slidably mounted to the forward member 56 such that it may move, relative to the forward member 56, only in a direction parallel to the rectangular grooves 58. The forward member 56 is preferably substantially rigidly mounted to the transmission housing 20.

A hole 52 is formed through the center of the disc member 44. An output shaft 60 extends from a rearward end, through the hole 52 in the disc member 44, through the plate member 48 and is mounted for rotation about an output axis. Thereafter, the output shaft 60 extends through a bore formed in the forward member 56 to a forward end 68 located outside the transmission housing 20.

A dog unit 73, which is comprised of a plurality of dogs 70 and a circular spacer 76, includes a spring mechanism which is biased to urge the dogs 70 to extend further through the circular spacer 76 away from the center of the circular spacer 76. Each of the plurality of dogs 70 is coupled to the output shaft 60 such that it extends substantially tangentially away from the circular spacer 76 which is centered about the output shaft 60. Those skilled in the art will understand that, although the dogs 70 are shown contacting an inner cylindrical surface 72 of the cylindrical member 42 at an angle of approximately 60°, depending on the diameter of the inner cylindrical surface 72, the required power output of the transmission and the strength of the dogs 70, etc., the orientation and/or configuration of the dogs 70 may be altered to achieve any desired angle of contact with the inner cylindrical surface 42. The dogs 70 extend away from this circle toward the inner cylindrical surface 72, which includes a plurality of grooves oriented substantially parallel to the central axis of the cylindrical member 42. A spring 74 is coupled between the output shaft 60 and the dogs 70 and is biased to urge the dogs 70 away from the output shaft 60 and away from each other. Each of the dogs 70 passes through the spacer 76 and extends toward the inner cylindrical surface 72. When in the neutral position, as shown in FIG. 3, each dog 70 is fully extended away from the spacer 76 and contacts the inner cylindrical surface 72. Those skilled in the art will understand that this clockwise angling of the dogs 70, as seen in FIG. 3, allows the output shaft 60 to be rotated counter-clockwise freely while providing a ratchet action which prevents the output shaft 60 from being rotated clockwise when the transmission is in the neutral position.

In operation, the rear housing 29 is rotated until the transmission is in the neutral position before the power to the electric motor is switched on. As the transmission is in the neutral position, the center of gravity of the counter weight 34 is located on the input axis and the central axis of the moveable crank shaft 38 is coincident with the input axis. When the electric motor is switched on, the input shaft 12 rotates at a substantially constant speed and the moveable crank shaft 38 rotates freely about the cylindrical member 42. As stated previously, the cylindrical member 42 can not rotate about its central axis. Thus, when the moveable crank shaft 38 is centered, the cylindrical member 42, the dogs 70 and the output shaft 60 are stationary and the transmission is in neutral.

In order to transmit power to the output shaft, the rear housing 29 is rotated, thereby gradually moving the bearing 21 rearward relative to the lateral member 22. This pushes the member 27 rearward and consequently causes the members 24 and 26 to rotate about pins 28 and 30, respectively. The rotation of gear 24 causes the counter weight 34 to move so that its center of gravity is displaced from the input axis in a first direction. Rotation of the gear 26 causes the moveable crank shaft 38 to move such than its central axis is displaced from the input axis in a direction opposite to the displacement of the center of gravity of the counter weight 34. As the moveable crank shaft 38 is moved away from the input axis, the horizontal and vertical components of the rotation of the inner cylindrical surface 40, as seen in FIG. 3, are transmitted to the cylindrical member 42 which is slidably received within the moveable crank shaft 38. This causes the disc member 44 to move relative to the plane member 48 in a direction parallel to the rectangular grooves 50 and causes the plate member 48 to move, relative to the forward member 56, in a direction parallel to the rectangular grooves 58. Thus, the cylindrical member 42 orbits the input axis counter-clockwise as seen in FIG. 3, without rotating about its own central axis. The orbiting motion of the cylindrical member 42 brings the dogs 70 into and out of contact with the grooved inner surface 72 of the cylindrical member 42 and causes the dogs 70 and, therefore, the output shaft 60 to rotate counter-clockwise as seen in FIG. 5. Further rotation of the rear housing 29 increases the distance between the central axis of the moveable crank shaft 38 and the input axis. The larger the distance between the central axis of the moveable crank shaft 38 and the input axis, the greater the extent of the transverse movement of the cylindrical member 42 and the greater the motion of the outer ends of the dogs 70. Thus, the rotational speed of the output shaft 60 is increased gradually as the rear housing 29 is rotated further from the neutral position. Those skilled in the art will recognize that, although the maximum rotational speed of the output shaft 60 will be lower than the rotational speed of the input shaft the rotational speed of the output shaft 60 may be increased to a desired rotational speed through the use of conventional gearing devices. In addition, those skilled in the art will recognize that many well known devices may be employed to adjust the distance between the central axis of the moveable crank shaft 38 and the input axis. For example, servo motors which may be operated manually or electronically controlled may be used.

FIG. 7 shows a cross-sectional view of a Benesch transmission according to a second embodiment of the present invention. The device according to the second embodiment shows a Benesch transmission which includes a first plurality of dogs 70 wherein each of the dogs 70 extends substantially tangentially away from a circular spacer 76 centered about the output shaft 60 such that each dog 70 is angled counter-clockwise when viewed from the rear and a second plurality of dogs 70' wherein each of the dogs 70' extends substantially tangentially away from a circular spacer 76' centered about the output shaft 60 such that each dog 70' is angled clockwise when viewed from the rear. The first and second pluralities of dogs 70 and 70', respectively, are located within the cylindrical member 42 and operate such that, an orbiting motion of the cylindrical member 42 in the first direction, brings contacting surfaces 71 of the dogs 70 into and out of contact with the grooved inner surface 72 of the cylindrical member 42 and causes the dogs 70 and, therefore, the output shaft 60 to rotate counter-clockwise in a second direction opposite the first direction. However, an orbiting motion of the cylindrical member 42, in the second direction, brings contacting surfaces 71' of the dogs 70' into and out of contact with the grooved inner surface 72 of the cylindrical member 42 and causes the dogs 70' and, therefore, the output shaft 60 to rotate in the first direction. When in the neutral position, the angling of the outer portions of the dogs 70 and 70' provides a ratchet action which prevents the output shaft from being rotated in either direction.

FIG. 8 shows a cross-sectional view of a Benesch transmission according to a third embodiment of the present invention. The device according to the third embodiment shows a more sturdy design of the dog unit 73, the dogs 70 and the cylindrical member 42. The dogs 70 of the device according to the third embodiment include geared feet 78 which are rotatably mounted to the outer ends of the dogs 70 by means of pins 80. In addition, the dogs 70 are formed of curved substantially rigid members the initial portions of which are rotatably mounted to the spacer 76 by means of pins 82 each of which is rigidly connected to a corresponding dog 70. The spacer 76 is non-rotatably mounted to the output shaft 60 by means of a key 83. The angle of rotation permitted to each dog 70 is limited by the size of the space "a" between the projections 86 on the spacer 76. In addition, as seen in FIG. 9, the spacer 76 may include a plurality of bores 84 each of which is adapted to receive a spring 88. One end of each spring 88 is coupled to the spacer 76 while the other end is coupled to a respective dog 70 so that each dog 70 is urged into a rest position. As shown in FIG. 8, these springs may alternatively be mounted to the surface of the spacer 76.

FIGS. 10–12 show a Benesch transmission according to a fourth embodiment of the present invention the wherein a mechanism, which may be constructed as described in regard to the first embodiment, is employed to move a counterweight 34 away from the input axis in a first direction while moving a spindle 90 a corresponding distance away from the input axis in the opposite direction. The spindle 90 is rotatably received in a bore 92 formed through the center of a dog unit 73 which may be constructed as described in regard to the first embodiment. The dog unit 73 is received within an inner geared cylindrical surface 94 of a stationary housing 96. A forward end 98 of the dog unit 73 is coupled to a rearward end of a splined shaft 97 by means of a rearward universal gear 100. The forward end of the splined shaft 97 is received in a shaft 99 including a hollow rearward portion. The shaft 99 is coupled to the output shaft 60 by means of a forward universal gear 102 and the output shaft 60 is mounted within bearings 104 for rotation about the output axis. This coupling between the dog unit 73 and the output shaft 60 allows the output shaft 60 to rotate about the output axis when the dog unit 73 moves orbitally about this axis within the inner cylindrical surface 94.

In operation, rotation of the input shaft 12 causes rotation of the counterweight 34 and the spindle 90. When the spindle 90 is located on the input axis, the transmission 10 according to the fourth embodiment is shaft 60 to rotate about the output axis when the dog unit 73 moves orbitally about this axis within the inner cylindrical surface 94.

In operation, rotation of the input shaft 12 causes rotation of the counterweight 34 and the spindle 90. When the spindle 90 is located on the input axis, the transmission 10 according to the fourth embodiment is in the neutral position and the dogs 70 are fully extended from the circular spacer 76 so that they contact the inner geared surface 94 of a stationary cylindrical housing 96. When in the neutral position, the spindle 90 rotates freely within the bore 92 and the dog unit 73 is stationary and non-rotating. As the transmission 10 is moved out of the neutral position, the spindle 90 moves away from the input axis and causes the dog unit 73 to move within the inner cylindrical surface 94 along an orbital path. As the dog unit 73 orbits the input axis, contact between the dogs 70 and the inner cylindrical surface 94 causes the dog unit 73 to rotate about the spindle 90 in a direction opposite the direction of rotation of the input shaft 12. This, in turn causes rotation of the rearward universal gear 100 and, consequently, rotation of the splined shaft 97 and the shaft 99. As the shaft 99 rotates, the rotation of the forward universal gear 102 causes the output shaft 60 to rotate within the bearings 104 about the output axis. As stated in regard to the previously described embodiments of the present invention, the greater the distance the spindle 90 is moved from the input axis, the greater the orbital motion of the dog unit 73 and, therefore, the larger the gearing ratio achieved. Similarly, in the neutral position, the output shaft is locked and my not be rotated in a direction opposite the angling of the dogs 70.

Those skilled in the art will understand that the variations described in regard to the first three embodiments may also be employed in a device according to the fourth embodiment of the present invention. For example, by extending the spindle through two dog units 73 each of which includes oppositely angled dogs 70, forward and reverse operation may be achieved. In addition, the more rugged construction of the dog unit 73 described in regard to the third embodiment of the present invention may also be employed in a transmission according to the fourth embodiment.

It will be understood by those skilled in the art that, in the place of the cylindrical member, a transmission according to the present invention my employ any member having an inner surface which extends along a portion of a circle to rotate dogs coupled to an output shaft as these dogs come into and out of contact with this part circular inner surface.

In addition, there are further variations of the disclosed embodiments which will be obvious to those skilled in the art. It is understood that these variations are within the scope of the invention which is limited only by the following claims.

What I claim is:

1. A device for varying the rotational speed of an output shaft relative to the rotational speed of an input shaft whose axis defines a central axis, comprising:

a crank shaft defining a crank shaft axis, the crank shaft being moveable in a plane not parallel to the crank shaft axis, wherein the crank shaft is driven orbitally about the central axis by the input shaft;

input means for selecting one of a range of values for the rotational speed of the output shaft relative to the rotational speed of the input shaft;

means for moving the crank shaft axis a distance proportional to the value selected by the input means, such that, when the input shaft is rotated about the central axis, the crank shaft orbits the central axis;

a cylindrical member defining a cylindrical member axis substantially parallel to the crank shaft axis, wherein the cylindrical member is received within the crank shaft so that, when the input shaft is rotated about the central axis, the cylindrical member orbits the central axis with the crank shaft;

means for preventing the cylindrical member from rotating about the cylindrical member axis; and means coupled to the output shaft for engaging the cylindrical member as it revolves about the central axis so that the output shaft is rotated about an output shaft axis, wherein, when the distance is zero so that the crank shaft axis and the central axis are coincident, the cylindrical member is stationary and the means for engaging the cylindrical member prevent rotation of the output shaft about the output shaft axis in a first direction.

2. A device according to claim 1 wherein the axis of the moveable crank shaft is substantially parallel to the central axis.

3. A device according to claim 1, wherein the means for engaging the cylindrical member comprises a plurality of contacting members coupled to the output shaft about the circumference of the output shaft and extending outward from the output shaft at an angle, wherein the angle defines a drive direction in which the output shaft is rotated when the input shaft is driven in a drive direction.

4. A device according to claim 3, wherein the cylindrical member includes an inner substantially cylindrical geared surface for contacting the contacting members.

5. A device according to claim 1, wherein, as the distance between the central axis and the crank shaft axis is increased from substantially zero to a predetermined maximum distance, the rotational speed of the output shaft gradually increases from zero to a maximum output shaft rotational speed.

6. A device according to claim 3, wherein each of the contacting members defines a central end coupled to the output shaft and an outer end and, wherein each contacting member includes a contacting foot rotatably coupled to its outer end.

7. A device according to claim 6, wherein each contacting foot includes a geared surface for engaging the cylindrical member.

* * * * *